Patented June 13, 1933

1,914,121

UNITED STATES PATENT OFFICE

CARL S. HAMERSLEY, OF NEW YORK, N. Y.

METHOD FOR USE IN CONNECTION WITH THE WRAPPING OF FOOD

No Drawing. Application filed July 24, 1930. Serial No. 470,542.

This invention relates to an improved method to be employed in connection with the wrapping of food products, more particularly bakery products such as breads, cakes, etc., and has for one of its objects the provision of a method or process whereby the growth of mould on such products is retarded and to a large extent prevented and whereby the freshness of the food will be preserved.

In the baking of breads, for example, on a commercial scale it is customary to remove the loaves from the oven and allow them to stand in the open for from one to three hours until cooled before being wrapped. During this period bacteria and mould spores which may be carried by the dust particles in the room become deposited on the loaves so that when the loaf is wrapped the bacteria and mould spores are wrapped also. Conditions are then ideal for the growth of these bacteria and of the mould, with the result that a loaf wrapped under such conditions will remain fresh for only a short period due to the action of the bacteria and soon becomes mouldy due to the growth of the mould spores.

The present invention provides a method to be used in connection with the wrapping of bakery products, such as those above mentioned, whereby these conditions are eliminated.

Briefly, my invention consists in applying or bringing into contact with the bakery product to be wrapped material which inhibits the growth of bacteria and mould.

More specifically the present invention provides a method wherein I enclose or confine between the wrapper and the loaf being treated a material, such as that above noted, to wit, material which inhibits the growth of bacteria within the loaf and the growth of the mould spores on the loaf.

Still more specifically the present invention consists in liberating oxygen in contact with the food being wrapped. This may be effected in various ways as, for example, by the use of hydrogen peroxide which may be sprayed or otherwise applied to the loaf just prior to or while wrapping or to the wrapper itself. Or the loaf may be wrapped in an atmosphere of such material, it being understood that the wrapper employed for the loaf is a waxed paper or other imperforate material capable of preventing loss of the liberated active substance.

My method may also be practiced by producing an electrical discharge in the air surrounding the material being wrapped to produce ozone either just prior to or during the wrapping operation.

I have obtained excellent results employing a solution of hydrogen peroxide which was sprayed on the inside of a waxed paper wrapper while the paper was being fed to the wrapping machine.

I have been unable to find that there is any detrimental effect on the loaf so far as its appearance and edibility are concerned, inasmuch as the end products resulting from the practice of my invention are simply oxygen and sterile water.

I find also that in the use of the present invention the loaf can be wrapped hotter and sooner after its removal from the oven than under present practice.

What I claim is:

1. The process of treating panified products of the type of bread and cake, which process comprises sealing the freshly baked product with hydrogen peroxide in an imperforate wrapper having a cellulose base at room temperature and at atmospheric pressure.

2. The process of treating panified products of the type of bread and cake, which process comprises applying hydrogen peroxide to the surface of a fresh loaf of the food product and then sealing the product at room temperature and atmospheric pressure in an imperforate wrapper having a cellulose base.

3. The process of treating panified products of the type of bread and cake, which process comprises applying hydrogen peroxide to an imperforate wrapper having a cellulose base and sealing this wrapper at room temperature and atmospheric pressure about the freshly baked food product.

This specification signed this 22 day of July, 1930.

CARL S. HAMERSLEY.